US 6,687,394 B1

(12) United States Patent
Mori (10) Patent No.: US 6,687,394 B1
(45) Date of Patent: Feb. 3, 2004

(54) METHOD AND APPARATUS FOR QUANTIFYING IMAGE

(75) Inventor: Keiji Mori, Tokyo (JP)

(73) Assignee: Fuji Photo Film Co. Ltd., Kanagawa (JP)

(*) Notice: Subject to any disclaimer, the term of this patent is extended or adjusted under 35 U.S.C. 154(b) by 0 days.

(21) Appl. No.: 09/545,836

(22) Filed: Apr. 10, 2000

(30) Foreign Application Priority Data

Apr. 8, 1999 (JP) .......................................... 11-101786

(51) Int. Cl.[7] ................................................ G06K 9/00
(52) U.S. Cl. ...................... 382/132; 382/165; 382/168; 382/180; 378/44; 378/62
(58) Field of Search ................................. 382/164, 165, 382/168, 170, 171, 172, 272, 128, 130, 132, 228, 174, 180; 358/464, 538; 378/44, 62

(56) References Cited

U.S. PATENT DOCUMENTS

| | | | | | |
|---|---|---|---|---|---|
| 4,630,304 A | * | 12/1986 | Borth et al. | ................ | 384/94.3 |
| 4,975,970 A | * | 12/1990 | Zettel et al. | ................ | 382/131 |
| 5,025,480 A | * | 6/1991 | Morton et al. | ............. | 382/271 |
| 5,046,118 A | * | 9/1991 | Ajewole et al. | ............ | 382/169 |
| 5,181,254 A | * | 1/1993 | Schweizer et al. | .......... | 382/100 |
| 5,214,744 A | * | 5/1993 | Schweizer et al. | .......... | 382/103 |
| 5,268,967 A | * | 12/1993 | Jang et al. | ................... | 382/132 |
| 5,555,318 A | * | 9/1996 | Ito et al. | ...................... | 382/168 |
| 5,588,071 A | * | 12/1996 | Schultz | ........................ | 382/168 |
| 5,606,587 A | * | 2/1997 | Barski et al. | ................... | 378/62 |
| 5,881,166 A | * | 3/1999 | Farrell | ........................ | 382/168 |
| 5,903,660 A | * | 5/1999 | Huang et al. | ............... | 382/132 |
| 6,120,445 A | * | 9/2000 | Grunwald | ................... | 600/437 |
| 6,198,845 B1 | * | 3/2001 | Tse et al. | .................... | 382/169 |
| 6,222,642 B1 | * | 4/2001 | Farrell et al. | ................ | 358/1.9 |
| 6,259,807 B1 | * | 7/2001 | Ravkin | ........................ | 382/133 |
| 6,353,674 B1 | * | 3/2002 | Dewaele | ..................... | 382/132 |
| 6,363,162 B1 | * | 3/2002 | Moed et al. | ................. | 382/112 |
| 6,415,062 B1 | * | 7/2002 | Moed et al. | ................. | 382/260 |

FOREIGN PATENT DOCUMENTS

| | | | | | |
|---|---|---|---|---|---|
| JP | 02206882 A | * | 8/1990 | ........... | G06F/15/70 |
| JP | 07334662 A | * | 12/1995 | ............. | G06T/1/00 |
| JP | 08043538 A | * | 2/1996 | ............. | G01T/1/29 |
| JP | 08184599 A | * | 7/1996 | .......... | G01N/33/60 |
| JP | 08247931 A | * | 9/1996 | .......... | G01N/21/17 |
| JP | 09167227 A | * | 6/1997 | ............. | G06T/5/00 |

OTHER PUBLICATIONS

Patent Abstracts of Japan 07334662 Dec. 22, 1995.
Patent Abstracts of Japan 08043538 Feb. 16, 1996.
Patent Abstracts of Japan 08247931 Sep. 27, 1996.

* cited by examiner

Primary Examiner—Bhavesh M. Mehta
Assistant Examiner—Christopher Sukhaphadhana
(74) Attorney, Agent, or Firm—Sughrue Mion, PLLC (57) ABSTRACT

The image quantifying method and apparatus perform quantification from two-dimensional digital image information. The method and apparatus set a background region which is not including a region of interest around the region of interest to be quantified in a two-dimensional image based on the two-dimensional digital image information, determine a statistical distribution of pixel-based intensity for all pixels in the background region, determine an average intensity of the region of interest which serves as a reference for finding the region of interest significant from a statistical quantity obtained from the statistical distribution and test the region of interest for its significance based on the determined reference average intensity. By the method and apparatus, even a region of interest having low intensity can be tested for its significance in a sufficiently rational and correct manner to realize correct quantitative treatment and analysis of the image in that region of interest.

19 Claims, 3 Drawing Sheets

METHOD AND APPARATUS FOR QUANTIFYING IMAGE

BACKGROUND OF THE INVENTION

This invention relates to a system for providing quantification of two-dimensional image information, particularly, to an image quantifying method and apparatus that sets a reference value by which an image included within a region of interest that has been set on a two-dimensional digital image is tested for its significance.

Various detection methods have been known in the art. They include i) an autoradiographic detection method in which a living body administered a radiolabelled substance or a portion of a tissue of such living body is subjected to contact sensitization or exposure on a radiation film or the like for a specified time to obtain position information for the radiolabelled substance in the specimen, ii) a chemiluminescence detection method in which an immobilized polymer such as protein or nucleic acid sequence that has been selectively labelled with a chemiluminescence emitting marker is contacted by a chemiluminescent substance to produce chemiluminescence in the visible range, which is detected to give polymer-related information such as genetic information, iii) an electron microscopic detection method in which a metallic or non-metallic sample is exposed to electron beams and the resulting diffraction or transmission image of the sample is detected to perform its elemental, compositional or structural analysis, or a tissue of a living body is exposed to electron beams and the resulting image of the tissue is detected, and iv) a radiation diffraction image detection method in which a sample is irradiated and the resulting radiation diffraction image of the sample is detected to analyze its structure. In all of these methods, photographic films such as high-speed x-ray films are used as a detecting material, on which radiation image, chemiluminescent image, electron micrographic image, radiation diffraction image, etc. are recorded as visible image that can be detected with the human eye.

In these various detection methods, it was recently proposed that photographic films heretofore used as the detecting material should be replaced by a stimulable phosphor which, upon exposure to radiation, visible light, electron beams, etc., absorbs their energy in a cumulative manner and, when later excited with electromagnetic waves or exciting light in a specified wavelength range, emits stimulated light in a quantity proportional to the accumulated energy of the applied radiation, visible light or electron beams. The stimulated light from the phosphor is detected photoelectrically and converted to digital signal; the resulting image data is subjected to specified image processes to produce an image which is reproduced on a display device such as a CRT screen or a photographic image. The use of the stimulable phosphor eliminates the need to perform a chemical treatment called "development". The detection methods using the stimulable phosphor have other advantages including high speed which contributes to a considerably shorter exposure time and easy exposure, as well as good linearity between the energy of applied radiation, visible light and electron beams, and the resulting image intensity, plus great breadth of the linear range which means a wide dynamic range and high reliability in quantification. As a further advantage, the image intensity can be obtained as a digital image signal (data) and conversion to digital signal precedes image reproduction; therefore, by performing signal processing on the obtained digital image data, a desired image can be reproduced or quantitative analysis can: be accomplished with a computer.

Image forming and analyzing apparatus for use with an autoradiographic detection method, a chemiluminescence detection method, an electron micrographic detection method and a radiation diffracttion image detection method that share the common feature of using the stimulable phosphor sheet to generate image data and reproducing an image on the basis of the generated image data have been disclosed in commonly assigned Unexamined Published Japanese Patent Application (kokai) Nos. 334662/1995, 43538/1996 and 247931/1996. The disclosed image forming and analyzing apparatus are so adapted that in order to make comparison between desired regions of an image, a desired region of the image data is defined as a region of interest and the quantity of light emission from the stimulable phosphor sheet is digitized as the intensities (densities) of the image-creating pixels in this region of interest and the total sum of their intensities is determined for subsequent quantitative treatment; the apparatus are also adapted to be such that two or more regions of interest are grouped together and pertinent parameters such as the relative intensities of the regions of interest in the same group are calculated to enable subsequent quantitative analysis. To fulfill these functions of the apparatus, the region of interest in a displayed two-dimensional image as on a display device is delineated by a circle, a rectangle or a graphic figure bounded by kinked lines and graphic data such as coordinate data for these figures are stored as a separate entity from the image data, thereby enabling quantitative treatment or analysis of the intensities of the pixels in the region of interest.

The image data obtained by detection with the stimulable phosphor sheet contains not only various kinds of detected image data, it also contains diverse background noise. Noise components to be mentioned first are those which, during sensitization or exposure of the stimulable phosphor sheet, occur practically uniformly on the sheet due to cosmic rays and the radiations in the ground or the inherent radiation from the thin-layer chromatographic (TLC) plate for promoting development in TLC which is often practiced in studies of drug metabolism. Other noise components originate in the stimulable phosphor sheet when radiation image information is being read from it. In order to ensure more correct computing of intensity data for the individual pixels in the image that has been captured from the sheet, the data corresponding to the background which constitute the noise components must be removed from the intensity data for the individual pixels in the image.

To this end, the image forming and analyzing apparatus under consideration draws one or more graphic figures in that region of the displayed image which should inherently have a zero intensity and, using these "background" figures, calculates a reference background value (i.e., intensity per unit area) from their intensities. To determine the correct reference background value, the image analyzer disclosed in Unexamined Published Japanese Patent Application (kokai) No. 43538/1996, supra, adopts a special technique in which a plurality of background regions having figures of the same size and shape as a region of interest are set around the region of interest, the intensities of those background regions are determined, and a reference background value which is a threshold for evaluating the region of interest as a "significant" one is determined from the statistical distribution characteristics of those intensities. For example, the intensities of those background regions are averaged to determine the "average intensity", which is used as the reference background value.

If the intensity of a single background figure is used as a reference background value, the correctness of the value is not guaranteed since it is largely dependent on the position where the background figure is set. This problem is absent from the image analyzer disclosed in Unexamined Published Japanese Patent Application (kokai) No. 43538/1996, supra; however, the method it adopts to solve the problem consists of setting a plurality of background regions having background figures of the same size and shape and determining the reference background value from the statistical distribution characteristics of their average intensity. Statistically, the obtained intensity data are deviated and unsuitable for insuring correctness in testing the region of interest for its significance. This problem is particularly great if the region of interest has low intensity.

SUMMARY OF THE INVENTION

The present invention has been accomplished under these circumstances and has as an object providing a method for image quantification by which even a region of interest having low intensity can be tested for its significance in a sufficiently rational and correct manner to realize correct quantitative treatment and analysis of the image in that region of interest.

Another object of the invention is to provide an apparatus for implementing the method.

In order to attain the object described above, the present invention provides an image quantifying method for performing quantification from two-dimensional digital image information, comprising the steps of setting a background region around a region of interest to be quantified in a two-dimensional image based on the two-dimensional digital image information, the background region not including the region of interest, determining a statistical distribution of pixel-based intensity for all pixels in the background region, determining an average intensity of the region of interest from a statistical quantity obtained from the statistical distribution, the average intensity serving as a reference for finding the region of interest significant, and testing the region of interest for its significance based on the determined reference average intensity.

It is preferred that the reference average intensity is expressed using a representative value of the statistical distribution which is selected from among statistical quantities of the statistical distribution and wherein the statistical distribution is an intensity histogram for the pixels in the background region.

It is also preferred that the histogram is smoothed for determining the representative value.

It is further preferred that the representative value is an average of the statistical distribution, which is also the reference average intensity.

It is yet further preferred that the representative value comprises an average A and a standard deviation S of the statistical distribution and wherein the reference average intensity is A+kS (where k is a positive number of 0–5).

It is still further preferred that the representative value comprises a mode M and a standard deviation S of the statistical distribution and wherein the reference average intensity is M+kS (where k is a positive number of 0–5).

In order to attain the another object described above, the present invention provides an image quantifying apparatus for performing quantification from two-dimensional digital image information, comprising a display device which displays a two-dimensional image based on the two-dimensional digital image information, a setting device which sets a background region around a region of interest to be quantified in the displayed two-dimensional image, the background region not including the region of interest, a statistical treatment device which determines a statistical distribution of pixel-based intensity for all pixels in the background region and determines a statistical quantity from the statistical distribution, a determining device which determines an average intensity of the region of interest from the determined statistical quantity, the average intensity serving as a reference for finding the region of interest significant, and a testing device which tests the region of interest for its significance based on the determined reference average intensity.

It is preferred that the determining device determines the reference average intensity using a representative value of the statistical distribution which is selected from among statistical quantities of the statistical distribution and wherein the statistical treatment device determines an intensity histogram for the pixels in the background region as the statistical distribution.

It is also preferred that the statistical treatment device smoothes the histogram for determining the representative value.

It is further preferred that the determining device selects an average of the statistical distribution as the representative value and wherein this average is substituted for the reference average intensity.

It is yet further preferred that the determining device selects an average A and a standard deviation S of the statistical distribution as the representative value and determines the reference average intensity as A+kS (where k is a positive number of 0–5).

It is still further preferred that the determining device selects a mode M of the statistical distribution and a deviation S from M as the representative value and determines the reference average intensity as M+kS (where k is a positive number of 0–5).

DETAILED DESCRIPTION OF THE INVENTION

The image quantifying method and apparatus of the invention are described below in detail with reference to the preferred embodiment shown in the accompanying drawings.

Figure 1:
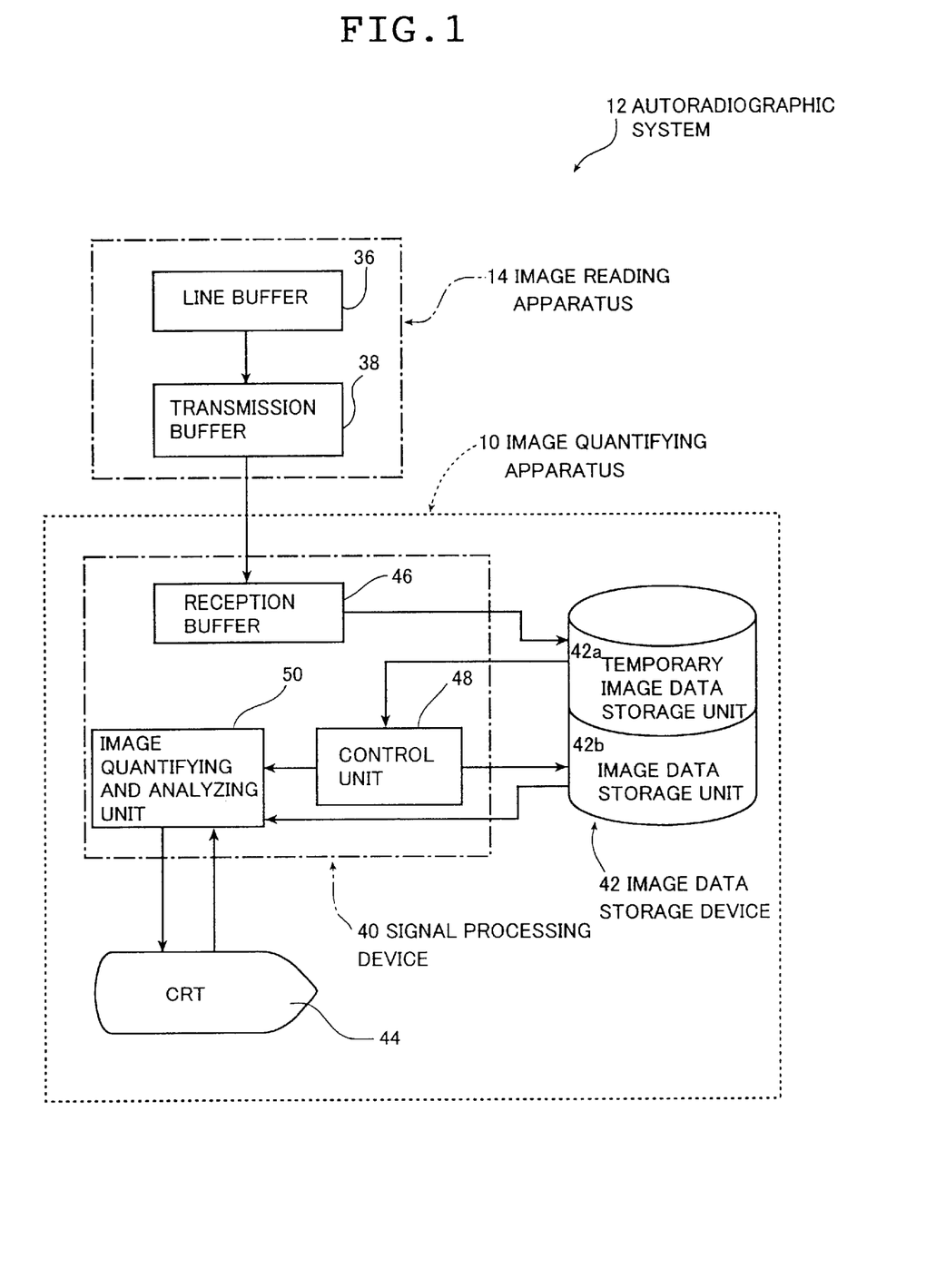
FIG. 1 is a block diagram for an exemplary autoradiographic system that employs the image quantifying apparatus according to the second aspect of the invention for implementing the image quantifying method according to the first aspect of the invention.

FIG. 1 is a block diagram for an exemplary autoradiographic system that employs the image quantifying apparatus according to the second aspect of the invention for implementing the image quantifying method according to the first aspect of the invention. In the following description, an embodiment in which the image quantifying method and apparatus of the invention are applied to an autoradiographic system which intends to analyze the image information on an autoradiographic image is taken as a representative case but this should not be taken as limiting the present invention.

As shown in FIG. 1, the autoradiographic system that employs the concept of the invention and which is generally indicated by 12 has an image quantifying apparatus 10 of the invention for performing quantitative treatment and analysis on autoradiographic image and an image reading apparatus 14 for supplying the image quantifying apparatus 10 with digital image data about autoradiographic image.

Let us first describe the image reading apparatus 14 that is connected to the autoradiographic image quantifying apparatus 10 for supplying it with digital image data about autoradiographic image.

Figure 2:
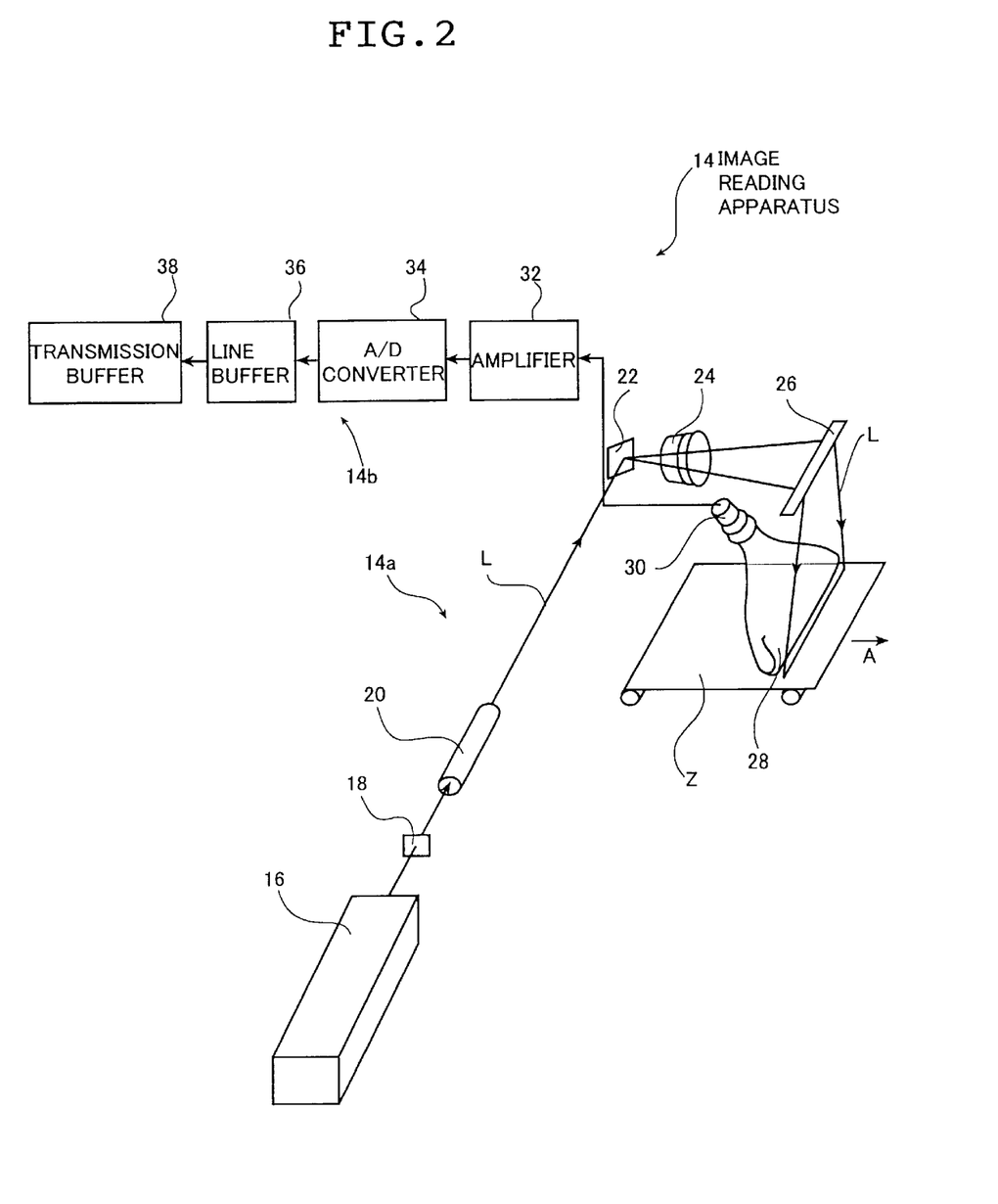
FIG. 2 is a perspective view showing schematically an example of the image reading apparatus used in the autoradiographic system shown in FIG. 1.

FIG. 2 is a perspective view showing schematically an example of the image reading apparatus 14 by which the autoradiographic image recorded cumulatively on a stimulable phosphor sheet Z is read as digital image data. On the stimulable phosphor sheet Z, position information for a radiolabelled substance contained in a sample (not shown) is accumulated in the form of radiation energy. The term "position information for a radiolabelled substance" means various kinds of position-related information for the radiolabelled substance or its aggregate in the sample, as exemplified by the location and shape of the aggregate of radiolabelled substance in the sample, the concentration of the radiolabelled substance in that location and its distribution; these kinds of information may be obtained either individually or in desired combinations as position information for the radiolabelled substance. In the embodiment under consideration, a plurality of drugs having different ingredients are administered,to a plurality of laboratory animals, from which urine is collected after the lapse of a predetermined time and subjected to chromatographic development on PLC plates; images of the obtained protein samples are cumulatively recorded on the stimulable phosphor sheet Z.

The stimulable phosphor sheet Z on which the position information for the radiolabelled substance in the sample has been thusly recorded in a cumulative fashion is sent to a reading unit 14a of the image reading apparatus 14, where laser light L issuing from a laser light source 16 scans the sheet Z so that it is excited to emit stimulated light. The laser light L from the laser light source 16 passes through a filter 18 to cut off the wavelength range which corresponds to that of the stimulated light emission from the excited sheet Z. The laser light L is then passed through a beam expander 20 to achieve correct adjustment of its beam size before it is incident on an optical deflector 22 such as a galvanometer mirror. The laser light L deflected by the optical deflector 22 passes through an fθ (scanning) lens 24 and is reflected by a plane reflector mirror 26 to be incident on the stimulable phosphor sheet Z one-dimensionally. The fθ lens 24 guarantees that the stimulable phosphor sheet Z is kept scanned with the laser light L at a uniform beam speed. In synchronism with this laser beam scan, the stimulable phosphor sheet Z is moved in the direction of arrow A (see FIG. 2) so that its entire surface is scanned with the laser light L. Upon illumination with the laser light L. the stimulable phosphor sheet Z emits stimulated light in a quantity proportional to the cumulatively stored radiation energy and the outgoing stimulated light is launched into a lightguide sheet 28.

The lightguide sheet 28 has a linear light receiving end and is positioned close enough to the stimulable phosphor sheet Z so that the light receiving end is opposed to the scanning line on the sheet Z. The exit end of the lightguide sheet 28 has an annular shape and is connected to the light receiving face of a photodetector 30 capable of photoelectric conversion as exemplified by a photomultiplier. The lightguide sheet 28 is made of a transparent thermoplastic resin such as an acrylic synthetic resin and its shape is so determined that the light admitted into the light receiving end travels with repeated total reflections by the inner surfaces until it passes through the exit end to reach the light receiving face of the photodetector 30. Thus, the stimulated light emerging from the stimulable phosphor sheet Z in response to illumination with laser light L is launched into the lightguide sheet 28 and travels with repeated total reflections by the inner surfaces until it passes through the exit end to be captured by the photodetector 30. The light receiving face of the photodetector 30 is fitted with a filter that transmits light in the wavelength range of the stimulated light emission from the stimulable phosphor sheet Z but which cuts off light in the wavelength range of the laser light L. Therefore, only the stimulated light from the stimulable phosphor sheet Z is detected photoelectrically with the photodetector 30. The above-mentioned laser light source 16, filter 18, beam expander 20, optical deflector 22, fθ lens 24, plane reflector mirror 26, lightguide sheet 28 and photodetector 30 combine together to make up the reading unit 14a.

The stimulated light detected photoelectrically with the photodetector 30 is converted to an electrical signal and sent to a captured signal converting unit 14b where it is converted to a signal suitable for input to the image quantifying apparatus 10 of the invention. To state more specifically, the electrical signal is first fed into an amplifier 32 having a predetermined amplification factor and amplified to a predetermined level before it is input to an A/D (analog/digital) converter 34. In the A/D converter 34, the electrical signal is converted to a digital signal at a scale factor suitable for the anticipated width of signal variation and the digital signal is then input to a line buffer 36. The line buffer 36 is a temporary storage of image data corresponding to a row of scanning lines. After storing image data corresponding to a row of scanning lines, the line buffer 36 sends out the stored image data to a transmission buffer 38 having a larger capacity. When a predetermined volume of image data has been stored, the transmission buffer 38 sends it out to the image quantifying apparatus 10 of the invention which is adapted to perform quantitative treatment and analysis on autoradiographic image. The above-mentioned amplifier 32, A/D converter 34, line buffer 36 and transmission buffer 38 combine together to make up the captured signal converting unit 14b.

Turning back to FIG. 1, the autoradiographic image quantifying apparatus 10 comprises a signal processing device 40, an image data storage device 42, and an image display device (CRT) 44. The image data containing position information for the radiolabelled substance in the sample that has been cumulatively recorded on the stimulable phosphor sheet Z, captured with the image reading apparatus 14 and converted to a digital signal is received by the signal processing device 40 and subjected to signal processing suitable for reproduction of a visible image. The signal processing device 40 also delineates desired regions in a portion of the image data as a region of interest and surrounding background regions, calculates various quantitative and analytical values such as the densities of the pixels in those regions (which correspond to radiation intensities, hence, signal intensities, and are hereunder referred to as "intensity" or "intensities" whichever is appropriate), and tests the region of interest for its significance. The image data storage device 42 comprises a temporary image data storage unit 42a in which the image data input from the image reading apparatus 14 into the signal processing device 40 is stored temporarily and an image data storage unit 42b for storing the image data that has been subjected to signal processing. The CRT 44 is a device by which the image data containing position information for the radiolabelled substance in the sample is reproduced as an image.

The signal processing device 40 has a reception buffer 46, a control unit 48, and an image quantifying and analyzing unit 50. The reception buffer 46 receives the image data about autoradiographic image from the transmission buffer 38 in the image reading apparatus 14. The control unit 48 controls reading of the temporarily stored image data from the temporary image data storage unit 42a in the image data storage device 42, as well as reading from and writing to the image data storage unit 42b; the control unit 48 also controls the overall operation of the image quantifying apparatus 10 of the invention. The image quantifying and analyzing unit 50 is the most characterizing part of the image quantifying apparatus 10 and has the following functions; it performs signal processing on the image data from the image data storage unit 42b so as to enable the reproduction of a visible image that has appropriate levels of density, color and contrast while featuring good observational analytic and quantitative characteristics; it also delineates desired regions in a portion of the image data as a region of interest and surrounding background. regions and calculates various quantitative and analytical values such as the densities of the pixels in those areas (which correspond to radiation intensities, hence, signal intensities, and are hereunder referred to as "intensity" or "intensities" whichever is appropriate); to give just an example for the region of interest, its average intensity is calculated, and for a background region, the statistical distribution of the intensities of the pixels in the region is determined to calculate a reference background value which is a unique feature of the invention and serves as a threshold for evaluating the region of interest to be significant; the image quantifying and analyzing unit 50 also tests the region of interest for its significance on the basis of the calculated reference background value and the average intensity of the region of interest.

The image stored temporarily in the transmission buffer 38 in the image reading apparatus 14 is sent for temporary storage into the reception buffer 46 in the signal processing device 40 in the autoradiographic image quantifying apparatus 10. When a predetermined amount of image data has been stored in the reception buffer 46, it is sent for temporary storage into the temporary image data storage unit 42a of the image data storage device 42. Thus, the image data sent out from the transmission buffer 38 in the image reading apparatus 14 for temporary storage into the reception buffer 46 in the signal processing device 40 is forwarded for temporary storage into the temporary image data storage unit 42a of the image data storage device 42. When the image data obtained by scanning the entire surface of the stimulable phosphor sheet Z with laser light L has been thusly stored in the temporary image data storage unit 42a of the image data storage device 42, the control unit 48 in the signal processing device 40 reads predetermined image data from the temporary image data storage unit 42a and stores it in the image data storage unit 42b.

Figure 3:
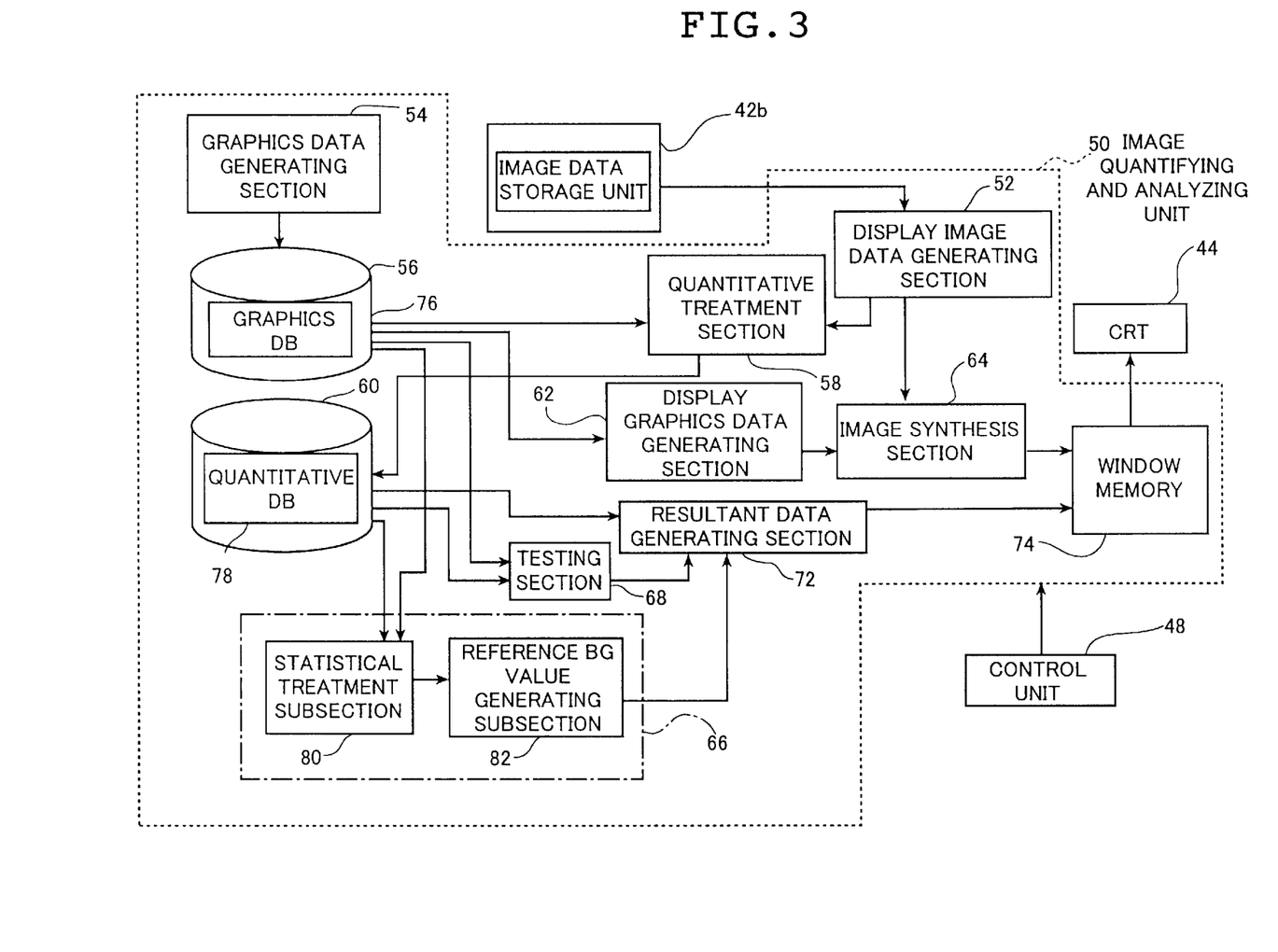
FIG. 3 is a block diagram for an example of the image quantitative analyzing unit used in the autoradiographic system shown in FIG. 1.

FIG. 3 is a block diagram showing details of the image quantifying and analyzing unit 50 in the autoradiographic image quantifying apparatus 10 according to the embodiment under consideration, as well as its peripheral circuitry.

As FIG. 3 shows, the image quantifying and analyzing unit 50 comprises a display image data generating section 52, a graphics data generating section 54, a graphics data storage section 56, a quantitative treatment section 58, a quantitative data storage section 60, a display graphics data generating section 62, an image synthesis section 64, a background data managing section 66, a testing section 68, a resultant data generating section 72, an d a window memory 74. In response to the operator's manipulation of an input device (not shown), the display image data generating section 52 performs predetermined processing on the image data from the image data storage unit 42b to generate display image data about the image to be displayed on the CRT 44. The graphics data generating section 54 generates graphics data such as circles, rectangles and graphic figures bounded by kinked lines for surrounding predetermined regions of the image being displayed on the screen of the CRT 44, as exemplified by a region of interest and surrounding background regions, and outputs the generated graphics data to the graphics data storage section 56 which stores the input graphics data. The quantitative treatment section 58 compares the graphics data stored in the graphics data storage section 56 with the display image data generated by the display image data generating section 52 and, on the basis of this comparison, the section 58 generates quantitative data indicative of quantitative parameters such as the intensity of the image included in the figure being displayed on the screen of the CRT 44. The quantitative data storage section 60 stores the quantitative data generated by the quantitative treatment section 58. On the basis of the graphics data stored in the graphics data storage section 56, the display graphics data generating section 62 generates display graphics data about the figures to be displayed on the CRT 44. The image synthesis section 64 synthesizes the display image data with the display graphics data. The background data managing section 66 performs a statistical treatment using quantitative data generated by the quantitative treatment section 58 on the basis of the graphics data for a plurality of figures set by the operator in the background regions around the region of interest and which data has been generated by the graphics data generating section 54. In the case under consideration, the quantitative data is intensity data for all pixels in all background regions that have been set by the operator. As a result of this statistical treatment, the background data managing section 66 generates and stores the reference background value which is a unique feature of the invention. The testing section 68 tests the region of interest for its significance using the reference background value thus generated in the background data managing section 66. The resultant data such as the result of testing the region of interest that has been found significant by the testing section 68, as well as the associated quantitative and analytical values are generated in a suitable form such as tables by the resultant data generating section 72 on the basis of the data stored in the quantitative data storage section 60, background data managing section 66 and testing section 68. The composite image data generated by the image synthesis section 64 and the resultant data generated by the resultant data generating section 72 are stored temporarily in the window memory 74 until they are output to the CRT 44.

In response to the operator's manipulation of an input device, the display image data generating section 52 generates display image data which is larger or smaller than the image data that has been selectively read from the image data storage unit 42b. The degree of enlargement or reduction is determined by a predetermined scaling ratio entered by the operator. In order to surround the region of interest in the image being displayed on the screen of the CRT 44 and the surrounding background regions, the operator manipulates the mouse (not shown) to select suitable shapes for graphics data from a memory (not shown) and arrange figures of the selected shapes on the screen of the CRT 44 to thereby generate graphics data, which is then stored in the graphics data storage section 56. The graphic data storage section 56 has a graphics data base 76 which stores graphics data for each of the figures that have the shapes selected by the operator and which have been arranged in desired positions. When the operator has arranged the selected figures on the screen of the CRT 44, figure species data that indicate the species of the selected figures and coordinate data that indicate the positions where the selected figures are located on the image data stored in the image data storage unit 42b are stored by the graphics data storage section 54 in predetermined regions of the graphics data base 76.

Each of the graphics data stored in the graphics data base 76 by the graphics data generating section 54 has at least two kinds of data, figure species data indicative of the kind of a selected figure and coordinate data that indicates the position of a reference point in the figure. In the embodiment under consideration, the figure species may include circles, rectangles and graphic figures bounded by kinked lines. When the figure is located on the image data stored in the image data storage unit 42b, the coordinate data for a reference point in the figure represents the coordinates of the point, say, (x,y), at the top left corner of a rectangle circumscribed with said figure. If more than one figure has been selected to surround the region of interest and the background regions, the respective figures are preferably assigned different numbers as a key to management. At the same time, the figures are preferably classified into groups and managed by group. The method of group management is not limited in any particular way and any known methods such as the one described in Unexamined Published Japanese Patent Application (kokai) No. 43538/1996, supra, may be employed.

The graphics data stored in the graphics data storage section 56 is subsequently read into the display graphics data generating section 62 where it is subjected to predetermined processing. The processed graphics data is output to the image synthesis section 64 and synthesized with the display image data. The resulting composite data is output to the CRT 44 via the window memory 74. The quantitative data storage section 60 has a quantitative data base 78 which stores quantitative data on a figure-by-figure basis; the quantitative data consists of PSL value data associated with the intensities of the image-forming pixels in the figures arranged on the screen of the CRT 44, as well as area data that indicates the areas of the figures. The PSL value data presents the integral of radiation received by a region in the stimulable phosphor sheet Z that corresponds to the image region bounded by a figure. Suppose here that the operator manipulates an input device (not shown) to designate a certain figure and gives a command for performing a quantitative treatment on the region of the figure. Then, the quantitative treatment section 58 reads predetermined graphics data from the graphics data base 76; the region of image data included in the figure corresponding to said graphics data is also read from the display image data generating section 52 and the area of the figure as well as the intensities of the image-forming pixels in the figure are calculated by the section 58. These parameters make up quantitative data and the section 58 stores it in a predetermined region within the quantitative data base 78, namely, in the region corresponding to the graphics data captured from the graphics data base 76.

The background data managing section 66 comprises a statistical treatment subsection 80 and a reference background (BG) value generating subsection 82 (which is hereunder referred to as a reference value generating subsection). The statistical treatment subsection 80 performs a statistical treatment using intensity data for all pixels in the operator-set background region (if more than one background region has been set, the pixels are in all of these background regions). The reference value generating subsection 82 generates a reference background value from the statistical values obtained in the statistical treatment subsection 80.

The statistical treatment subsection 80 first captures graphics data which concerns a plurality of figures that have been set by the operator in the background regions around the region of interest, which has been generated in the graphics data generating section 54 and which has been stored in the graphics data base 76 in the graphics data storage section 56. The statistical treatment subsection 80 also captures the quantitative data within a corresponding figure that have been generated in the quantitative treatment section 58 on the basis of the captured graphics data and which have been stored in the quantitative data base 78 in the quantitative data storage section 60. In the case under consideration, the quantitative data is intensity data for all pixels in all of the operator-set background regions. Using all of the captured intensity data, the statistical treatment subsection 80 determines statistical distributions such as histograms. From the thus determined statistical distributions such as histograms, the statistical treatment subsection 80 calculates at least one statistical quantity such as the average, standard deviation and mode and sends it to the reference value generating subsection 82. To calculate a statistical quantity that can be used as a representative value, the histograms determined as statistical distributions are preferably subjected to smoothing.

Using the received statistical quantity as a representative value of the statistical distributions generated in the statistical treatment subsection 80, the reference value generating subsection 82 calculates the reference background value, stores the calculated reference background value and sends it to the testing section 68.

The reference background value to be determined in this step means a reference average intensity, or the average intensity of the region of interest which serves as a reference for finding that the region of interest set by the operator is a significant region. Hence, the reference background value may safely be regarded as the lower limit of the average intensity of the region of interest above which said region of interest is found "significant".

As a representative value of the statistical distributions, the reference value generating subsection 82 preferably selects the average A from among the statistical quantities mentioned above and uses it as the reference background value.

More preferably, the reference value generating subsection 82 selects the average A and the standard deviation S as two representative values of the statistical distributions and defines the reference background value by A+kS, where k is a positive integer of 0–5 or any one of 0, 1, 2, 3, 4 and 5.

The reference value generating subsection 82 may select the mode M in place of the average A and defines the reference background value by M+kS (where k is a positive integer of 0–5).

Described above is the basic construction of the background data managing section 66 which performs a statistical treatment of the background regions according to the present invention and generates and stores the reference background value.

The testing section 68 tests the region of interest for its significance using the reference background value generated in the reference value generating subsection 82 of the background data managing section 66. To be more specific, the testing section 68 performs the following operations: capturing the graphics data that has been set by the operator as the region of interest, generated in the graphics data generating section 54 and stored in the graphics data base 76 in the graphics data storage section 56; capturing the quantitative data within the corresponding figure of the region of interest that has been generated in the quantitative treatment section 58 on the basis of the captured graphics data and stored in the quantitative data base 78 in the quantitative data storage section 60 (in the case under consideration, the quantitative data to be captured is average intensity data, or the average of the intensity data for all pixels in the operator-set region of interest); comparing the captured average intensity data for the region of interest with the reference background value generated in the reference value generating subsection 82; and finding the region of interest "significant" if the average intensity data is greater than the reference background value and "not significant" if the average intensity data is equal to or smaller than the reference background value.

The testing section 68 sends the result of testing to the resultant data generating section 72. If the region of interest has been found "significant", the resultant data generating section 72 generates the resultant data such as the result of testing and the associated quantitative and analytical values on the basis of the data stored in the quantitative data base 78 in the quantitative data storage section 60, the background data managing section 66 and the testing section 68. In a typical case, the resultant data may be generated in the form of tables. The following are the steps in the process by which the resultant data generating section 72 generates the resultant data: it calculates the corresponding reference background value from the background data managing section 66; it then calculates the product of the area of the figure of the significant region of interest and the reference background value; it also calculates the difference between the PSL value for the figure of the region of interest and the calculated product to determine the corrected PSL value; it generates the resultant data using these calculated values. The generated resultant data is expanded in a predetermined region of the window memory 74 which outputs the expanded resultant data to the CRT 44 on a predetermined timing.

The result of testing is not the only example of the resultant data and other examples include the PLS value for the significant region of interest, its area, the PSL value per unit area, the product of the reference background value and the area of a figure, the corrected PSL value (the difference between the PSL value and the product) and the corrected PSL value per unit area. In addition to these pieces of the resultant data, the figure number and the background number may also be displayed on the CRT 44.

The resultant data generating section 72 is so adapted as to be capable of performing quantitative analysis on groups of figures in accordance with the operator's instruction. To be more specific, the resultant data generating section 72 calculates a quantitative analytical value such as the proportion of the total of the PSL values for the figures in a certain group that is occupied by the PSL or corrected PSL value for each figure in the group or the proportion of the PSL or corrected PSL value per unit area of a certain figure in a certain group that is occupied by the PSL or corrected PSL value per unit area of another figure in the group; the quantitative analytical value is displayed on the screen of the CRT 44 via the window memory 74.

In the embodiment described above, the background data managing section 66 uses the same quantitative data for both the region of interest and the background region, as exemplified by the pixel-based intensity data that has been generated by the quantitative treatment section 58 from the graphics data generated by the graphics data generating section 54 and stored as the graphics data base 76 in the graphics data storage section 56 and the image data generated by the display image data generating section 52 and which has been stored as the quantitative data base 78 in the quantitative data storage section. 60. This is not the sole case of the invention and the following alternative may be substituted; the operator manipulates the input device to activate the background data managing section 66; he then selects and sets a background figure for calculating the reference background value and calculates intensity data for the pixels in the thus set background figure from the image data stored in the image data storage unit 42b. Remember that the background is exemplified by the noise component that is created by cosmic rays or the radiations in the ground and which occurs substantially uniformly on the stimulable phosphor sheet Z during exposure, as well as the noise component that originates from the stimulable phosphor sheet when radiation image information is being read from the sheet. When performing a quantitative treatment on the image data generated on the basis of this stimulable phosphor sheet Z, the density of the image-forming pixels in a figure has to be checked in the absence of the above-mentioned noise components. As already mentioned herein, in order to ensure that the intensity data for the pixels in the image captured from the stimulable phosphor sheet can be calculated more correctly, data representing the noisy background has to be removed from the intensity data for the pixels in the captured image.

The present invention is by no means limited to the foregoing example and various improvements and modifications can be made without departing from the spirit of the invention. Such improvements and modifications are of course included within the scope of the invention. In the foregoing description of an embodiment of the invention, an autoradiographic image created by thin-layer chromatography (TLC) of a protein is given as a typical example of two-dimensional images. The present invention is by no means limited to the TLC-based autoradiographic image and may be applied extensively to analyses of the following images: i) autoradiographic images such as an autoradiographic image of gene for use in Southern hybridization, an autoradiographic image for use in protein separation or identification or evaluation of its molecular weight and characteristics by polyacrylamide gel electrophoresis, and an autoradiographic image for use in the studies of pathways and conditions of metabolism, absorption and excretion of drugs administered to mouse and other laboratory animals; ii) chemiluminescent images based on chemiluminescence such as a chemiluminescent image of gene for use in Southern hybridization, a chemiluminescent image created by thin-layer chromatography of protein, and a chemiluminescent image for use in protein separation or identification or evaluation of its molecular weight and characteristics by polyacrylamide gel electrophoresis; iii) electron beam transmission or diffraction images of metallic or non-metallic samples created with an electron microscope, electron micrographic images of living tissues, and radiation diffraction images of metallic or nonmetallic samples. Needless to say, the concept of the invention is applicable to image information analyzing systems (image analyzing method and apparatus) intended to treat a general class of two-dimensional images such as common radiation image, electron microscopic image and chemiluminescent image, as well as other two-dimensional images such as aerial photographic image, satellite photographic image and astrophotographic image that need be tested for the significance of the image in a region of interest.

In the foregoing embodiment, the quantitative treatment section 58 calculates quantitative data using the display image data generated in the display image data generating section 52. This is not the sole case of the invention and the image data stored in the image data storage unit 42b may be used to calculate quantitative data for all regions irrespective of whether they are the region of interest or background regions.

In the foregoing embodiment, the quantitative data base 78 is so adapted as to store data representing the PSL value and the area of a figure. If desired, it may be so modified as to store the PSL or corrected PSL value per unit area. In the foregoing embodiment, image data obtained by converting the position information for the radiolabelled substance in the sample to an electrical signal is displayed as a visible image on the screen of the CRT 44. Alternatively, a visible image may be formed on a photographic film rather than the stimulable phosphor sheet Z, read photoelectrically and converted to an electrical signal to produce image data for subsequent treatment by the procedure described above.

The term "device" as used herein does not necessarily signify a physical device and covers the case of fulfilling the functions of individual device by software. The function of one device may be fulfilled by two or more physical device or, alternatively, the functions of two or more device may be fulfilled by one physical device.

According to the present invention, the region of interest in an image can be tested for its significance in a more rational and correct way and the image included in a figure delineated by the region of interest can be quantitatively treated and analyzed in a correct manner. As a result, even a region of interest having a lower intensity can be tested for its significance in a more rational and correct way, making it possible for the weak region of interest to be measured effectively. The invention also provides an objective criterion for discarding data about a false image due to the background effects which remain undetectable in the image by the prior art and this contributes to enhance the objectivity of the overall process of quantification.

What is claimed is:

1. An image quantifying method for performing quantification from two-dimensional digital image information, comprising the steps of:
    setting a background region around a region of interest to be quantified in a two-dimensional image based on said two-dimensional digital image information, said background region not including said region of interest;
    determining a statistical distribution of pixel-based intensity for all pixels in said background region;
    determining an average intensity of said region of interest from a statistical quantity obtained from said statistical distribution, said average intensity serving as a reference for finding said region of interest significant; and
    testing said region of interest for its significance based on the determined reference average intensity.

2. The method according to claim 1, wherein said reference average intensity is expressed using a representative value of said statistical distribution which is selected from among statistical quantities of said statistical distribution and wherein said statistical distribution is an intensity histogram for the pixels in said background region.

3. The method according to claim 2, wherein said histogram is smoothed for determining said representative value.

4. The method according to claim 2, wherein said representative value is an average of said statistical distribution, which is also said reference average intensity.

5. The method according to claim 2, wherein said representative value comprises an average A and a standard deviation S of said statistical distribution and wherein said reference average intensity is A+kS (where k is a positive number of 0–5).

6. The method according to claim 2, wherein said representative value comprises a mode M and a standard deviation S of said statistical distribution and wherein said reference average intensity is M+kS (where k is a positive number of 0–5).

7. The method according to claim 1, wherein the step of testing said region of interest comprises capturing average intensity data for the region of interest and comparing said captured average intensity data directly with said determined reference average intensity.

8. The method according to claim 7, wherein the step of testing said region of interest further comprises finding the region of interest as significant if said captured average intensity data is greater than said determined reference average intensity.

9. An image quantifying apparatus for performing quantification from two-dimensional digital image information, comprising:
    a display device which displays a two-dimensional image based on the two-dimensional digital image information;
    a setting device which sets a background region around a region of interest to be quantified in the displayed two-dimensional image, said background region not including said region of interest;
    a statistical treatment device which determines a statistical distribution of pixel-based intensity for all pixels in said background region and determines a statistical quantity from said statistical distribution;
    a determining device which determines an average intensity of said region of interest from the determined statistical quantity, said average intensity serving as a reference for finding said region of interest significant; and
    a testing device which tests said region of interest for its significance based on the determined reference average intensity.

10. The apparatus according to claim 9, wherein said determining device determines said reference average intensity using a representative value of said statistical distribution which is selected from among statistical quantities of said statistical distribution and wherein said statistical treatment device determines an intensity histogram for the pixels in said background region as said statistical distribution.

11. The method according to claim 10, wherein said statistical treatment device smoothes said histogram for determining said representative value.

12. The method according to claims 10, wherein said determining device selects an average of said statistical distribution as said representative value and wherein this average is substituted for said reference average intensity.

13. The method according to claim 10, wherein said determining device selects an average A and a standard deviation S of said statistical distribution as said representative value and determines said reference average intensity as A+kS (where k is a positive number of 0–5).

14. The method according to claim 10, wherein said determining device selects a mode M of said statistical distribution and a deviation S from M as said representative value and determines said reference average intensity as M+kS (where k is a positive number of 0–5).

15. The image quantifying apparatus according to claim 9, wherein said testing device captures average intensity data for the region of interest and compares said captured average intensity data directly with said determined reference average intensity.

16. The image quantifying apparatus according to claim 15, wherein said testing device further finds the region of interest as significant if said captured average intensity data is greater than said determined reference average intensity.

17. The apparatus according to claim 9 wherein the background region encloses the region of interest and determination of the statistical distribution omits pixel-based intensity of said background region.

18. The apparatus according to claim 17, wherein the background region comprises a user-selected section of the two-dimensional image, comprising selection of one or more geometric shapes from a plurality of geometric shapes to define the background region and selection of a size for said one or more shapes.

19. An image processing system for reading and quantifying image information of an image comprising:
   an image reading apparatus supplying image information from a stimulable phosphor sheet; and
   an image quantifying apparatus for performing quantification of image information, comprising:
      a display device which displays the image based on the image information;
      a setting device which sets a background region enclosing a region of interest to be quantified in the displayed image;
      a statistical treatment device which determines a statistical distribution of pixel-based intensity for all pixels in said background region and determines a statistical quantity from said statistical distribution, said statistical distribution omitting pixel-based intensity for said region of interest;
      a determining device which determines a reference average intensity of said region of interest from the determined statistical quantity, said reference average intensity serving as a reference for finding said region of interest significant; and
      a testing device which tests said region of interest for its significance based on the determined reference average intensity.

* * * * *